United States Patent Office 3,118,305
Patented Jan. 21, 1964

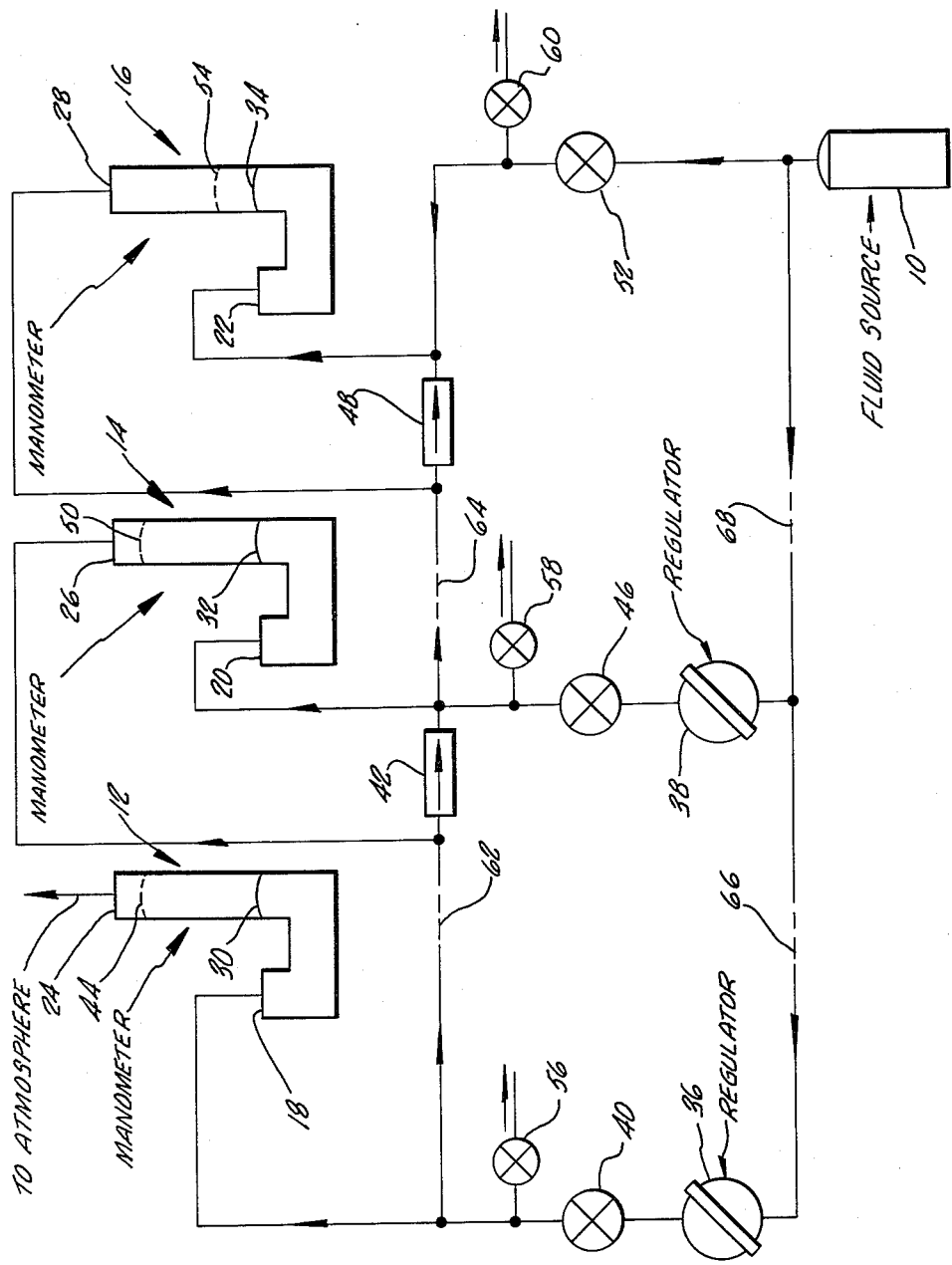

3,118,305
MANOMETER SYSTEM
Martin E. Weekes, Los Angeles, Calif., assignor to Charles Meriam Company, Inc., Los Angeles, Calif., a corporation of California
Filed Dec. 4, 1961, Ser. No. 156,624
6 Claims. (Cl. 73—401)

This invention is directed to improvements in apparatus for measuring fluid pressure and, more particularly, to an improved manometer system.

Due to the high sensitivity of a manometer in measuring fluid pressures, manometer systems are commonly employed in calibrating pressure gauges and where extreme accuracy in pressure measurement is required.

In a manometer the pressure of a test fluid is determined by the height to which an indicating fluid rises in a tubular member in response to the test fluid being applied to a well member of the manometer. Thus, when it is desired to measure relatively high fluid pressures it is necessary that the manometer employ a long tubular member. Such a manometer construction, however, presents obvious structural problems.

To overcome the problems associated with a manometer employing a long tubular member a manometer system has been developed for measuring high fluid pressures which includes a pressure switch in combination with a manometer having a relatively short tubular member. In this arrangement, when the indicating fluid rises within the tubular member to a predetermined level indicative of a predetermined pressure, the pressure switch opens allowing the fluid at the predetermined pressure to be applied to the end of the tubular member. The increase in pressure at the end of the tubular member forces down the level of the indicating fluid in the tubular member to a level which, when considered with the predetermined level, provides a measure of the unknown fluid pressure.

In practice, however, when the indicating fluid is forced downward by the operation of the pressure switch, oscillations are set up within the indicating fluid and an appreciable time is required, sometimes in the order of five minutes, before the indicating fluid level stabilizes to a point where an accurate reading of the fluid level may be made.

Thus, in addition to requiring a critically designed pressure switch arrangement, such a manometer system does not provide continuous rapid measurement of unknown fluid pressures.

In view of the above, the present invention provides an improved manometer system for measuring fluid pressures within a wide pressure range on a substantially continuous basis.

To accomplish this, the present invention in its basic form includes a pair of manometers, which may be termed the first and second manometers, and a pressure regulating device for passing a fluid having a pressure which lies within a predetermined pressure range. Preferably the predetermined pressure range is adjusted to be equal to the indicating range of the first manometer. Each manometer includes a well member having an indicating fluid such as mercury disposed therein, and a tube member, the height of which defines the indicating range of the manometer. The tube of the first manometer is exposed to a pressure reference to provide a reference for the manometer system. To measure the unknown pressure of a fluid, means are included for first passing the fluid through the regulator means and simultaneously applying it to the well of the first manometer and the well and tube members of the second manometer. Means are also included for then directly applying the fluid to the well of the second manometer.

In this manner, the fluid is first simultaneously applied to the well of the first manometer and the well and tube of the second manometer. Thus like pressures are applied to the well and tube of the second manometer to maintain the indicating fluid in the tube of the second manometer at a predetermined level corresponding to a zero pressure reading while the indicating fluid level in the first manometer rises within its tube member. If the unknown pressure fluid is less than the indicating range of the first manometer, the level of the indicating fluid within the tube of the first manometer is a direct measure of the unknown fluid pressure. However, if the magnitude of the unknown fluid pressure exceeds the range of the first manometer, the fluid is then directly applied to the well of the second manometer. Any difference in pressure between the fluid applied to the well and that applied to the tube member of the second manometer, causes the indicating fluid to rise within the tube of the second manometer. The level to which the indicating fluid rises in the tube of the second manometer then provides a direct measure of the unknown pressure of the fluid.

In operation, as the indicating fluid level rises in the tube of the second manometer, it exerts a back-pressure on the fluid passing from the regulator means to the tube member of the second manometer. However, since the pressure range of the regulator means is preferably adjusted to equal the indicating range of the first manometer, the regulator means bleeds a portion of the fluid from the system to maintain the pressure level of the fluid passing therethrough within the predetermined pressure range. This prevents the back-pressure from affecting the level of the indicating fluid in the first manometer thereby maintaining the accuracy of the reading of unknown fluid pressure.

The above as well as other features of the present invention may be more clearly understood by reference to the following detailed description which is to be considered with the drawing, the single figure of which is a schematic representation of a basic form of the manometer system of the present invention.

As represented in the drawing, to measure the unknown fluid pressure of the fluid passing from a fluid source, indicated generally at 10, the present invention includes a plurality of manometers. By way of example only, the system shown in the drawing includes three manometers, indicated at 12, 14, and 16, respectively. Each of the manometers 12, 14, and 16 has a well member 18, 20, and 22, respectively, and a tube member 24, 26, and 28, respectively. Disposed within each of the manometers is an indicating fluid, such as mercury, having an initial fluid level, noted at 30, 32, and 34, respectively. Each of the manometers 12, 14, and 16 possesses an indicating range defined by the length of its associated tube member. The indicating ranges of the manometer may be calibrated in series by markings on the edge of the tube member to provide means, as hereinafter described, for observing the level of the mercury within a tube member of one of the manometers and directly reading the magnitude of an unknown fluid pressure. Thus, for example, the manometer 12 may be calibrated to indicate pressures in a pressure range from 0 to 100 p.s.i., the manometer 14 calibrated to indicate a pressure in a pressure range from 100 to 200 p.s.i., and the manometer 16 calibrated to indicate pressures within a pressure range from 200 to 300 p.s.i.

Connecting each of the manometers 12 and 14 to the source 10 are fluid pressure regulators, indicated generally at 36 and 38. The regulators 36 and 38 may be of the spring-diaphragm pressure regulating type and are capable of passing fluids having pressures within an adjustable pressure range. Preferably the regulator 36 is adjusted to only pass fluids having a pressure within the indicating range of the manometer 12 and bleeds off fluids at higher pressures to maintain the pressure of the fluid passing therethrough within the indicating range of the manometer 12. Also the regulator 38 is preferably adjusted to only pass fluids having a pressure within a range defined by a sum of the indicating ranges of the manometers 12 and 14. Thus, if the fluid from the source 10 has a pressure greater than the pressure range of the regulator 38, the regulator 38 bleeds off fluid to maintain the pressure of the fluid passing therethrough within the predetermined pressure range.

As illustrated, the regulator 36 is coupled by a valve 40 to the well 18 of the manometer 12 and to the tube member 26 of the manometer 14. A valve, indicated at 42, is coupled between the valve 40 and the well 20 of the manometer 14. By way of example, the valve 42 may be an electrically or mechanically operated check valve for only passing fluid in a direction from the regulator 36 to the well 20.

In this manner, with the valve 40 open, fluid passes from the fluid source 10 through the regulator 36 to the well of the manometer 12 and to the well and tube member of the manometer 14. As represented, the tube 24 of the manometer 12 is exposed to a pressure reference such as the atmosphere. If the pressure applied to the well 18 of the manometer 12 exceeds the pressure reference, the level of the indicating fluid within the tube member 24 rises. If the unknown pressure of the fluid lies within the indicating range of the manometer 12, e.g. 0 to 100 p.s.i., the mercury rises to a level providing a direct indication of the magnitude of the unknown pressure. However, if the unknown pressure of the fluid exceeds the indicating range of the manometer 12 and the pressure of the fluid applied to the manometer 12 is limited to the pressure range by regulator 36, the mercury rises in the tube 24 to a maximum indicating level represented by the dotted line 44.

Since the fluid passing through the regulator 36 is applied both to the tube 26 and to the well 20 of the manometer 14, like pressures are applied to the indicating fluid within the manometer 14 thereby maintaining its fluid level at a zero pressure reading as indicated at 32.

To determine the magnitude of the unknown fluid pressure above the range of the manometer 12, the fluid from the source 10 is passed through the regulator 38 by opening a valve 46. The valve 46 couples the regulator 38 to the well 20 and to the tube member 28 of the manometer 16. Similar to the manometer 14, the fluid passing through the regulator 38 also passes through a valve 48 to the well 22 of the manometer 16.

In this manner, while a regulated pressure corresponding to the maximum range of the manometer 12 is being applied to the tube 26 of the manometer 14, the fluid from the source 10 having a maximum pressure regulated by the regulator 38 to the maximum range of the manometers 12 and 14 is passed to the well 20. The unknown magnitude of fluid pressure exceeding the range of the manometer 12 causes the mercury to rise within the tube 26. If the magnitude of fluid pressure is within the pressure range of the manometer 14, e.g. 100 to 200 p.s.i., the mercury rises to a level within the tube 26 which provides a direct measure of the unknown fluid magnitude. However, if the unknown fluid magnitude exceeds the range of the manometer 14, the mercury rises in the tube 26 to a maximum indicating level represented by the dotted line 50.

Since the fluid passing through the regulator 38 is applied both to the tube 28 and the well 22 of the manometer 16, the level of the mercury is maintained at a zero pressure reading as indicated at 34.

To determine the magnitude of the unknown pressure in excess of the pressure range of the manometer 14, a valve 52 coupling the source 10 to the well 22 is opened. In this manner the fluid from the source 10 is directly applied to the well 22. If the pressure of the fluid exceeds the maximum pressure of the range of the manometer 14 (that being the pressure of the fluid applied through the regulator 38 to the tube 28) the mercury rises within the tube 28. If the magnitude of the unknown pressure is within the range of the manometer 16, e.g. 200 to 300 p.s.i., the mercury rises within the tube 28 to a level such as indicated by the dotted line 54. The level of the mercury within the tube 28 may then be read directly to provide a measure of the unknown fluid pressure.

Accordingly, the manometer system including first, second, and third manometers provides means for first simultaneously applying a fluid of unknown pressure through a first regulator to the well of the first manometer, the wells of the second and third manometers, and the tubes of the second annd third manometers such that the indicating fluid only rises in the tube of the first manometer. Means are then operated for simultaneously applying the fluid through a second regulator to the well of the second manometer and the well and tube of the third manometer such that the indicating fluid only rises in the tube of the second manometer. Then means are operated for applying the fluid directly to the well of the third manometer such that the indicating fluid only rises in the tube of the third manometer. Thus, the present invention provides a direct measure of large fluid pressures without requiring the use of a manometer having an extremely long tubular member and provides means for measuring unknown fluid pressures on a substantially continuous basis—not requiring time to wait for fluctuations in a fluid level to subside.

Due to the arrangement of the regulators 36 and 38, means are provided for preventing any back-pressures, which may build up within the tube members 26 and 28 of the manometers 14 and 16 with a rise in the level of the mercury therewithin, from affecting the mercury level within the manometers 12 and 14, respectively. In particular, as the level of the mercury within the tube 26 of the manometer 14 rises, it creates a back-pressure upon the fluid being applied to the tube 26 from the regulator 36. By operation of the regulator 36, a portion of the fluid passing therethrough is bled off to maintain fluid flow through the regulator 36 within the pressure range defined thereby. In this manner, the fluid pressure applied to the well 18 of the manometer 12 is maintained and the level of the mercury within the tube member 24 remains fixed.

In a like manner, as the level of the mercury within the tube 28 rises, it creates a back-pressure on the fluid applied to the tube 28 through the regulator 38. By operation of the regulator 38, a portion of the fluid is bled off to maintain fluid flowing through the regulator 38 within the pressure range defined thereby. In this manner, the fluid pressure applied to the well 20 of the manometer 14 is maintained with a corresponding maintenance of the level of the mercury within the tube 26.

As indicated, the manometer system also includes bleeder valves 56, 58, and 60. The bleeder valves provide means for draining the system of the fluid developed by the fluid source 10 to return the system to its original state.

Although a manometer system has been described including three manometers, it is to be understood that the number of manometers employed is directly a function of the overall pressure range which is desired for the system. Thus, as represented by the broken lines 62, 64, 66, and 68, a low range system may include only the manometers 12 and 16 while for high range operation a number of manometer arrangements similar to 14 with a regulator similar to 38, may be included between the manometers 12 and 16.

What is claimed is:

1. A manometer system comprising: a first and a second manometer, each including a well and a tube member and each having an indicating fluid disposed therein, each manometer having an indicating range defined by its tube member; regulator means for passing a fluid having a pressure within the range of the first manometer; selectively operable means for substantially simultaneously and continuously applying a fluid having an unknown pressure through the regulator means to the well of the first manometer and to the well and tube of the second manometer such that indicating fluid only rises in the tube of the first manometer; and selectively operable means for applying the fluid of unknown pressure directly to the well of the second manometer such that the indicating fluid only rises in the tube of the second manometer.

2. A manometer system comprising: a first and a second manometer, each including a well and a tube member and each having an indicating fluid disposed therein, each manometer having an indicating range defined by the length of its tube member; a regulator for only passing fluids having a pressure within the indicating range of the first manometer; a first valve for coupling the regulator to the well of the first manometer and to the tube of the second manometer; a second valve for coupling the regulator to the well of the second manometer; a source of fluid having an unknown pressure; means for coupling the source to the regulator; and a third valve for coupling the source directly to the well of the second manometer.

3. The apparatus defined in claim 2 wherein the second valve is a check valve for only passing fluid from the regulator to the well of the second manometer.

4. A manometer system comprising: a first, a second, and a third manometer, each including a well and a tube member and each having an indicating fluid disposed therein; first and second regulator means associated with the first and second-manometers, respectively, for passing a fluid having a pressure within a predetermined pressure range defined by the regulators; selectively operable means for substantially simultaneously and continuously applying a fluid of unknown pressure through the first regulator to the well of the first manometer, the wells of the second and third manometers and the tubes of the second and third manometers such that the indicating fluid only rises in the tube of the first manometer; selectively operable means for substantially simultaneously and continuously applying the fluid of unknown pressure through the second regulator to the well of the second manometer and the well and the tube of the third manometer such that the indicating fluid only rises in the tube of the second manometer; and selectively operable means for applying the fluid of unknown pressure directly to the well of the third manometer such that the indicating fluid only rises in the tube of the third manometer.

5. A manometer system comprising: a first, a second, and a third manometer, each including a well and a tube member and each having an indicating fluid disposed therein; a first and a second regulator associated with the first and second manometers, respectively, each for passing a fluid having a pressure within a predetermined pressure range; a first valve for coupling the first regulator to the well of the first manometer and to the tube of the second manometer; a second valve for coupling the first regulator to the well of the second manometer; a third valve for coupling the second regulator to the second valve, the well of the second manometer and the tube member of the third manometer; a fourth valve for coupling the second regulator to the well of the third manometer; a source of fluid having an unknown pressure; means for coupling the source to the first and second regulators; and a fifth valve for coupling the source directly to the well of the third manometer.

6. Apparatus for measuring the pressure of a fluid source comprising: a plurality of fluid pressure indicators each having first and second fluid inputs and indicating the excess in pressure at the second inputs in relation to the first input; at least one fluid pressure regulator having an input and an output for limiting the output pressure of a fluid applied to the input of the regulator, the output of the regulator being connected to the first input of a first one of the indicators and to the second input of a second one of the indicators, the second input of the first one of the indicators being coupled to a pressure reference; a check valve connecting the output of the regulator to the first input of the second one of the indicators; and means for connecting the fluid source to the input of the regulator and the first input of the second one of the indicators.

References Cited in the file of this patent
UNITED STATES PATENTS

| | | |
|---|---|---|
| 2,562,494 | Hejduk | July 31, 1951 |
| 2,849,883 | Chapman | Sept. 2, 1958 |